(12) United States Patent
Peach

(10) Patent No.: US 6,923,199 B1
(45) Date of Patent: *Aug. 2, 2005

(54) DAMAGE RESISTANT VALVE ASSEMBLY

(75) Inventor: Gregory L. Peach, Englewood, FL (US)

(73) Assignee: Peach/Wheeler Associates, LLC, Englewood, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/441,261

(22) Filed: May 20, 2003

Related U.S. Application Data

(63) Continuation-in-part of application No. 09/884,685, filed on Jun. 19, 2001, now Pat. No. 6,571,818.

(51) Int. Cl.$^7$ .............................................. F16K 15/20
(52) U.S. Cl. ................... 137/223; 137/68.12; 137/529; 152/427
(58) Field of Search .......................... 137/68.11, 68.12, 137/223, 234.5, 529, 541, 797; 251/149.6, 251/339; 152/427

(56) References Cited

U.S. PATENT DOCUMENTS

| | | | | |
|---|---|---|---|---|
| 481,197 | A | * | 8/1892 | Roth ........................... 152/427 |
| 483,990 | A | * | 10/1892 | Burwell ...................... 152/427 |
| 485,540 | A | * | 11/1892 | Gibbs ......................... 251/339 |
| 586,752 | A | | 7/1897 | Bagot |
| 632,218 | A | * | 8/1899 | Goss et al. ............... 137/234.5 |
| 764,131 | A | * | 7/1904 | Keller, Jr. ................... 152/427 |
| 1,629,901 | A | | 5/1927 | Ahearn |
| 1,798,536 | A | | 3/1931 | Hoffmann |
| 2,621,700 | A | | 12/1952 | Snyder |
| 2,655,932 | A | * | 10/1953 | Lipman ....................... 251/339 |
| 3,157,219 | A | | 11/1964 | Dimin et al. |
| 3,289,686 | A | | 12/1966 | Tyler |
| 3,797,510 | A | | 3/1974 | Torres et al. |
| 3,863,697 | A | | 2/1975 | Brown |
| 3,916,929 | A | | 11/1975 | Brown |
| 4,365,643 | A | | 12/1982 | Masclet et al. |
| 4,628,953 | A | | 12/1986 | Correll et al. |
| 4,674,525 | A | | 6/1987 | Richards et al. |
| 4,718,639 | A | | 1/1988 | Sherwood et al. |
| 4,886,087 | A | | 12/1989 | Kitchen |
| 4,899,792 | A | | 2/1990 | Podgers |
| 5,211,202 | A | | 5/1993 | Zink et al. |
| 5,257,642 | A | | 11/1993 | Worth |
| 5,357,998 | A | | 10/1994 | Abrams |
| 5,529,085 | A | | 6/1996 | Richards et al. |
| 5,694,969 | A | | 12/1997 | DeVuyst |
| 5,699,822 | A | | 12/1997 | Bodhaine |
| 5,765,587 | A | | 6/1998 | Osborne |
| 5,791,366 | A | | 8/1998 | Lo |
| 5,988,245 | A | | 11/1999 | Rosenberg |
| 6,034,596 | A | | 3/2000 | Smith et al. |
| 6,260,569 | B1 | | 7/2001 | Abrams |

* cited by examiner

*Primary Examiner*—John Rivell
(74) *Attorney, Agent, or Firm*—Nixon Peabody LLP

(57) ABSTRACT

A tire air pressure valve assembly is described that has an air sealing surface disposed toward or inside the metal wheel of a vehicle, and a protective housing surrounding a portion of the valve. The valve has an external stem with a built in break away feature which prevents external damage to the valve stem from damaging the sealing surface located inside the tire and wheel. The location of the seating/sealing surface inside the wheel, or inside a housing mounted on the wheel, provides protection from collision induced sudden tire pressure loss due to valve damage incurred during collisions or simply being struck by an object in a car wash or on the street.

45 Claims, 9 Drawing Sheets

DAMAGE RESISTANT VALVE ASSEMBLY

This application is a CIP of Ser. No. 09/884,685 filed Jun. 19, 2001 now U.S. Pat. No. 6,571,818.

BACKGROUND OF THE INVENTION

1. Field of the Invention

This application is generally directed towards pressure valves, and more particularly to a damage resistant valve assembly for inflatable tires.

2. Description of Related Art

Automotive rollover accidents due to tire blowouts are a major concern in the automotive, trucking, bussing and racing industries. Most recently the Firestone/Ford Explorer rollover problems have been of major concern to the public and industry, and have been at least partially attributed to tire blowouts. In addition to the bad publicity, the lost business, the loss in public good will and confidence, and the high costs of tire and automobile recalls may represent major financial costs to tire and automobile manufacturers. Thus any improvement in actual or publicly perceived tire quality would be a benefit.

The tire inflation valve, which is likely to be the least expensive part of any vehicle, is one potential cause of catastrophic tire failures. This is because the valve stem of the tire inflation valve necessarily protrudes from the metal (for example steel or aluminum) wheel to enable inflation and deflation of the tire by the operator or service person. The protruding valve stem contains the valve sealing surface near the tip of the valve stem. This is so that the control actuator of the valve sealing surface may be accessed by the inflation nozzle that is applied to the tip of the valve stem. As a result of the location of the sealing surface, any damage to the valve stem that occurs below the level of the valve sealing surface results in sudden and complete deflation of the tire. Any vehicle that loses pressure in any one of its tires results in an unbalanced condition that adversely affects the handling of the vehicle. Such loss of handling efficiency may result in a loss of control of the vehicle by the operator, with understandable bad consequences to the operator, passengers or bystanders. Such loss of control instances may also represent a large economic loss or injury to the vehicle operators and to anybody else who is involved in the incident, for example bystanders.

The commonly used valve stems in automotive wheels may be rubber molded tubes that surround threaded brass valve bodies into which valves are screwed. The valve stems are designed to be inserted through the metal wheel rim from what will be the inside of the tire. If the portion of the tire valve stem that protrudes from the metal wheel impacts an object such as a rock or a curb, the portion of the tire valve stem that is torn or ripped off may contain the valve body with the sealing surface, and thus result in sudden tire deflation. In addition, an impact may completely rip the entire valve stem out of the steel wheel rim, thus also resulting in sudden tire deflation, and thus provoking a potentially life-threatening incident. Such damage and impact may also be due to acts of vandalism such as striking the very exposed valve stem with a knife or hammer. The damage may result in immediate loss of tire pressure, which may be easily noticed, or it may result in a weakened valve stem, that is not easily noticed, which weakened valve stem may suddenly rupture during high speed driving, resulting in a loss of control incident.

The extent of this problem may be seen in the attempts made to prevent sudden loss of tire pressure in the NASCAR race circuit. It is known that at the high speeds the typical racecar tire filled with nitrogen may have steel valve stem ruptures or failures that may occur upon any substantial contact with another car, side barriers or curbs. As a result some racecars have tires that contain a separately inflated inner tire so that the loss of pressure in a valve stem rupture accident is not complete, and thus the driver may maintain control of the vehicle. However, the inner tire adds weight to the vehicle, and thus slows the car down and affects the ability to turn. In addition, the inner tire may only last a short time before it also deflates, is thus not a solution to the valve stem rupture sudden deflation problem.

The problem of sudden deflation is not simply a racecar or automobile collision problem, but may also occur during normal traffic instances, such as highway driving on hot road surfaces resulting in increased tire pressure and thus possible valve stem rupture at either a manufacturing flaw or the site of a prior cut or impact, such as by a rock. This is because, as noted above, that the valve stem may be made of rubber with a metal valve body near the external tip. Thus an increased gas pressure inside the tire may be transmitted to the hollow valve stem at the portion below the valve that is still outside the metal wheel, which due to previous damage or manufacturing defect may then rupture.

The valve stem may rupture even if it is not made of rubber. Brass or steel valve stems may be attached to the metal wheel rim using sealing rings and nuts on either or both of the outside and inside of the wheel. Such metallic valve stems are also subject to damage due to impacts, rocks and vandalism, and further may be susceptible to thermal expansion mismatch, corrosion, repetitive bending and vibrations which may cause stress cracking. These cracks and defects may be hidden from view on the inner surface of the valve stem, or at the juncture of the valve stem and metal wheel, until the valve stem suddenly breaks under the influence of some event and the tire pressure is abruptly lost.

The problem of accidental damage to inflation/deflation valves is not limited to automobile tires. Any inflated object may have a valve that when damaged may cause the object to suddenly lose pressure and deflate, often with serious repercussions. Pressurized vessels and tanks also may have external valves that allow for either pressurization or for venting. The possibility of damage to the external valve may result in loss of the contents of the vessel or tanks, with potential for substantial damage to the tank or the surrounding environment. Examples of such tanks or vessels include compressed natural gas tanks and tanker trucks, chemical tankers transporting or storing liquids such as acids, alkali materials, chlorine bleach, mercaptans, pesticides, herbicides, radioactive or industrial wastes, the accidental release of which would clearly be a major problem. Other gaseous materials include various petroleum gases, hydrogen sulfide, hydrogen cyanide, sulfur dioxide, and fluorocarbons, all of which may be regularly transported by truck or train tankers, or stored in tanks in the manufacturing plants, in the ordinary course of manufacturing business, but are also deadly to the environment if released. Thus the normal transportation and storage of liquids and gases may involve the use of valves of the type discussed herein for accessing and removing gases, and for pressurizing tanks with inert or ordinary gases for safe storage and transportation, and for improved speed of off loading of various liquid materials. Any of these valves may be damaged by collisions, corrosion, accidental impacts or other damage, and result in the inadvertent release of potentially hazardous materials.

Thus it would be a benefit to automobile tire users and users of pressurized vessels and tanks to provide a valve that does not open when damaged due to accidents, overpressure situations, manufacturing defects, or accidental impacts.

SUMMARY OF THE INVENTION

An illustrative embodiment of the valve disclosed herein describes a valve comprising a valve stem, a valve body coupled to the valve stem and having a valve sealing surface with a valve sealing element disposed proximate to the sealing surface. A portion of the valve body is disposed to seal the valve stem to an aperture in a chamber that has an inside surface and an outside surface, and there is an elastic material biasing the sealing surface with respect to the sealing element. The sealing surface, the sealing element and the elastic member are disposed inside the chamber.

Alternative arrangements of the first illustrative embodiment of the valve disclosed herein describe a valve stem that has a weakened portion disposed at a location of the valve stem outside of the chamber. The valve stem weakened portion may have a location that is further from the chamber compared to the portion of the valve body that is disposed to seal the valve stem to the aperture in the chamber. The elastic member may be disposed to urge or bias the sealing element against the sealing surface with a predetermined force. The elastic member may be sensitive to a pressure difference between the inside of the chamber and the outside of the chamber, and upon the pressure difference exceeding a predetermined level, the elastic member may cease to urge the sealing element against the sealing surface. There may be a second elastic member disposed to urge the sealing element away from the sealing surface with a predetermined second force that is less than the predetermined force of the elastic member, and greater than a force required to separate the sealing element from the sealing surface against the predetermined pressure difference between the inside of the chamber and the outside of the chamber, in the absence of the urging of the elastic member. The elastic member may be sensitive to the temperature in the chamber, and upon the temperature exceeding a predetermined level, the elastic member may cease to urge the sealing element against the sealing surface. The second elastic member may be disposed to urge the sealing element away from the sealing surface with a predetermined second force that is less than the predetermined force of the elastic member, in the absence of the urging of the elastic member.

There may further be a hollow tubular cap disposed upon the end of the valve stem most distant from the valve base that includes a member disposed to enable the valve actuator to displace the sealing element to a location removed from contact with the sealing surface, resulting in a normally open valve. The cap member may be temperature sensitive and/or pressure differential sensitive, and upon the temperature or pressure exceeding a predetermined level, the cap member ceases to displace the sealing element away from the sealing surface. The chamber may contain a compressed gas, a combination of gases, a pressurized gas in at least partly liquid form, a liquid material having at least one of an inert or a non inert pressurized gas, and/or a pressurizable fluid.

In another illustrative embodiment of the valve disclosed herein there is a tire valve that comprises a valve stem, a valve body coupled to the valve stem with a valve sealing surface, a valve sealing element disposed proximate to the sealing surface, a valve actuator disposed to change a position of the sealing element with respect to the sealing surface, a spring biasing (e.g.; pushing or pulling) the sealing element against the sealing surface. There is a portion of the valve body disposed to seal the valve stem to an aperture in a wheel disposed to have a pneumatic tire installed thereon. The sealing surface, the sealing element and the spring are all disposed inside the surface of the wheel, and the valve stem has a weakened location disposed further outside of the wheel as compared to the portion of the valve body disposed to seal the valve stem to the wheel.

Alternative arrangements of the second illustrative embodiment of the valve disclosed herein describe a spring that pushes the sealing element against the sealing surface with a predetermined force. The spring may be sensitive to a pressure difference between the inside of the wheel and the outside of the wheel, and upon the pressure difference exceeding a predetermined level, the spring ceases to push the sealing element against the sealing surface with the predetermined force. There may further be a second spring disposed to bias or urge the sealing element away from the sealing surface with a predetermined second force that is less than the predetermined force, and greater than a force required to separate the sealing element from the sealing surface against the tire pressure difference, in the absence of the pushing of the spring. The first spring may be sensitive to the temperature in the wheel, and upon the temperature exceeding a predetermined level, the spring may melt and/or lose spring strength, and ceases to urge the sealing element against the sealing surface. There may further be a second spring disposed to urge the sealing element away from the sealing surface with a predetermined second force that is less than the predetermined force of the spring, and greater than a force required to separate the sealing element from the sealing surface against a pressure difference between the inside and outside of the wheel, in the absence of the urging of the spring. There may be a hollow tubular cap disposed upon an end of the valve stem most distant from the wheel that includes a member disposed to enable the valve actuator to displace the sealing element to a location removed from contact with the sealing surface, resulting in a normally open valve. The cap member may be a temperature sensitive and/or a pressure differential sensitive element, and upon the temperature or pressure exceeding a predetermined level, the cap member ceases to displace the sealing element away from the sealing surface. The wheel may be filled with compressed air, nitrogen, an inert gas, a reactive gas, and/or a combination of gases.

In a third illustrative embodiment, there are disclosed means for controllably sealing a chamber having a hollow stem, a body coupled to the hollow stem and having means for sealing a sealing surface against a sealing element disposed proximate to the sealing surface. There are means for biasing the sealing surface with respect to the sealing element, and the sealing surface, the sealing element and the biasing means are disposed within the protection of the chamber.

Alternative arrangements of the third illustrative embodiment include that the stem has means for stem breakaway disposed at a location of the stem outside of the chamber. The means for biasing may include a spring, an elastic material, a magnetic field, a fluid pressure differential, a remotely monitored electronic device, a remotely controlled electronic device, a remotely monitored electromechanical device, and a remotely controlled electromechanical device, and may bias the sealing element against the sealing surface with a predetermined force. The means for biasing may be sensitive to a temperature and/or a pressure difference between a region inside of the chamber and a region outside of the chamber and may include a second means for biasing disposed to bias the sealing element away from the sealing surface with a predetermined second force that is less than the predetermined force. There may be an externally controllable actuator resulting in a normally open valve, and it may be temperature or pressure sensitive.

In a fourth illustrative embodiment, the invention is a valve assembly including a valve as described in the first embodiment and a housing that surrounds a portion of the valve. The housing may communicate with the chamber, and be mounted on a wall of the chamber. The valve body, the sealing element and the sealing surface may be protectively enclosed within the housing. The housing may have an upper portion through which the hollow valve stem extends, and the valve body may be mounted to the upper portion of the housing via a nut and sealing gaskets. Preferably, the weakened portion of the valve stem is located proximate to the upper wall of the housing such that, in the event of an accident condition, the hollow valve stem will break off flush with the nut and sealing gaskets mounting the upper portion of the valve body to the upper portion of the housing. This particular embodiment is useful for applications where it is undesirable or impossible for the valve to protrude within the chamber, such as in an auto racing rim having outer and inner tires. In such a rim, the bead area must be smooth around the entire circumference of the rim to facilitate the installation and removal of the outer tire. Hence, the addition of a protective housing to the valve allows the valve to function in all the aforementioned ways without an intrusion of the valve body into the chamber.

Alternatively, the housing may protrude only a short distance away from the chamber wall and allow part or all of the valve body to protrude into the chamber. Such an embodiment is useful in instances where it is desirable that the valve be mounted onto the chamber wall from the outside of the chamber, and where intrusion of the valve body into the chamber is allowable. In such an embodiment, the valve is mounted in a shallow or flat housing which in turn is sealingly mounted around an opening in a chamber wall.

In still another embodiment, the housing may assume the form of a recessed well which extends through an opening in the chamber wall. Such an embodiment is useful in instances where it is desired that the hollow valve stem not protrude from the wall of the chamber. Such an embodiment offers a maximum amount of protection to all portions of the valve in the event of an accident condition, as the surrounding well provides protection to all exposed portions of the valve.

Finally, the housing may protrude from the chamber wall, but surround and protect the stem of the valve. In such an embodiment, the valve is mounted in the chamber wall with the valve body extending into the chamber in the same manner as described with respect to the first embodiment. The housing is mounted to the chamber wall around the valve stem of the valve, and is cylindrical in shape and dimensioned so that the entire valve stem is surrounded and protected. In a variation of this embodiment, the housing is conically shaped and may be mounted to either or both the chamber wall and the stem in order to protect the stem.

DETAILED DESCRIPTION OF ILLUSTRATIVE EMBODIMENTS

In general terms, the valve disclosed herein comprises a tire or other container air or gas pressure valve that has an sealing surface that is inside the wheel or pressure chamber, for example a vehicle having pneumatic tires on a metal wheel. The valve stem extends outside of the wheel or chamber for access purposes, and may have a built in break away feature so that damage to the valve stem occurring outside of the wheel or chamber causes stress to only the external portion of the valve, and not to the sealing surface inside the tire and wheel. Thus inadvertent damage to the valve does not result in loss of chamber or wheel pressure. Such an arrangement (i.e., the location of the sealing surface being inside the protection of the wheel or chamber, plus the built in breakaway feature) provides protection from catastrophic tire or chamber pressure loss due to valve damage from accidents or simply being struck by an object in a car wash, on the street or by workers and passersby.

Figure 1:
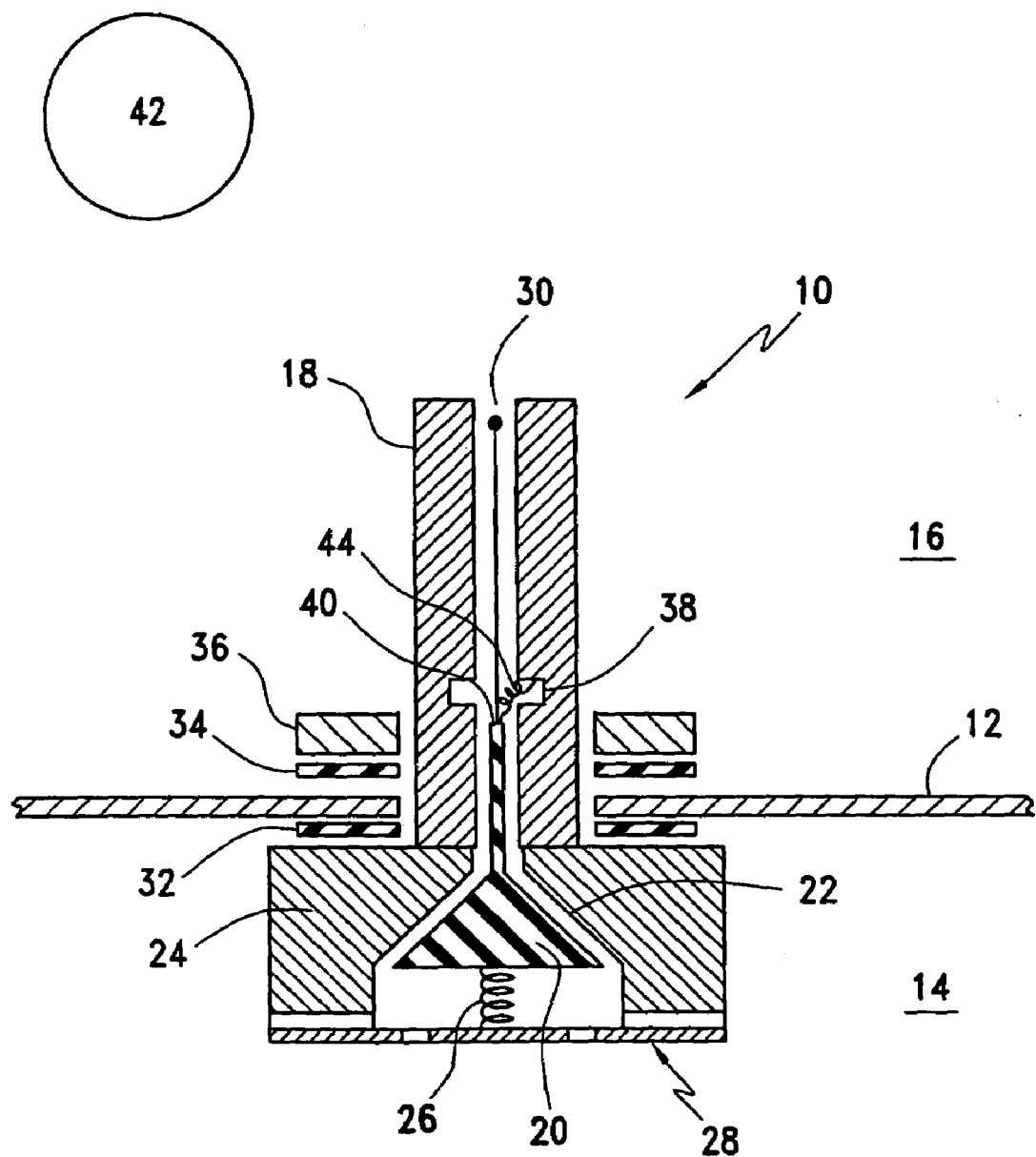
FIG. 1 is a cross section view of a normally closed embodiment of the claimed valve that may have an over temperature safety response.

Referring now to FIG. 1, a pressure valve, generally denoted 10, is attached to 5 an aperture in the wall of a chamber 12. The valve is shown in an open configuration in order to simplify the identification of the individual parts of the valve. In normal operation there would not be a clear path for fluid to flow through the valve 10 from the one side of the chamber wall 12 to the other. The chamber may be the metallic wheel of an automobile or truck, often made of steel or an aluminum alloy, with an elastic tire attached to the wheel 12 to complete the pressure chamber. The walls of the pressure chamber may also comprise an insulative material such as ceramic or glass as well as metals such as steel, aluminum, titanium or alloys of various metals. The specific material used may depend upon the specific use of the pressure chamber, for example glass or quartz is often used in vacuum chambers, which is another application for pressure valves of the type described herein. The chamber enclosed by the wall 12 will have an interior portion 14 which may contain a vacuum, pressurized gases, liquids, pressurized liquids or liquids under reduced pressures, and an exterior portion 16 which may be exposed to the outside environment, such as the atmosphere. For example, liquids may need to be stored under a protective atmosphere of an inert gas for long term stability. Alternately, liquid materials may be stored under pressure to improve the rate of unloading.

As noted previously, the valve 10 will include a valve stem 18 that extends away from the pressure chamber wall 12 to allow fluids to be controllably inserted from an external fluid source 42 through the hollow valve stem 18, past the sealing element 20, and thus into the interior 14 of the chamber. For example, a driver may use the valve 10 to add compressed air to the inside 14 of a vehicle pneumatic tire, until the internal pressure of the tire exceeds the external air pressure by a specified amount, thus controlling the weight load and lateral resistance and traction of the tire, among other tire properties. The valve stem being external to the protection of the interior 14 of the pressure chamber results in the potential for unintentional damage, or for increased ease of intentional damage. In the valve type commonly used in the industry for vehicle tires and pressurized fluid carriers, damage such as impacts, repetitive bending or vibrations, and cuts by sharp objects, may result in the valve stem 18 losing pressure integrity at a location below the sealing surface, which is often located at a position near the open tip of the valve stem 18 for reasons of ease of manufacture and use. If the valve loses pressure integrity below the sealing surface represented by the sealing element 20 and the sealing surface 22, then the interior of the chamber 14 may be in communication with the external environment 16, and the pressures may begin equalize at a rate determined in part by the size of the communicating opening. For example, a pressurized auto tire may deflate from 40 psi to zero pressure relative to the external atmospheric pressure, and thus the tire will go flat since there is no longer any internal pressure to counteract the weight of the vehicle.

The valve 10 may be made of many different materials such as rubber or elastomers for automotive tires, brass or steel for high pressure chambers, or titanium for corrosive materials. In all cases there is a possibility of the valve, for example at the valve stem, developing a loss of pressure integrity due to impact, cutting or repetitive stresses. Metals may be more susceptible to repetitive stresses such as bending or vibrations, and elastomers may be more susceptible to sharp edge cuffing and manufacturing defects that may blow out during over pressure situations such as a tire hitting a curb.

The sealing element 20 may be pressed against the sealing surface 22 of the valve body 24 by a elastic member such as a spring 26. The spring 26 may push against the sealing element 20 by being attached or held against a perforated plate 28 that is attached to the valve body 24. This is what is known as a normally closed valve, since in the absence of some external action, the passage from the interior of the chamber 14 to the exterior 16 is substantially blocked by the closely mating surfaces of the sealing element 20 and the sealing surface 22 of the valve body 24. There are numerous other well known methods to form a controllable seal, such as ball valves, poppet valves and various different shapes for the sealing surfaces, as well as different types of mating surfaces such as elastic, ground glass, polished metal, any of which will easily be seen by one of skill in the art to have application to the present arrangement, depending upon the materials and pressures to be utilized in the specific application. The arrangement of FIG. 1 is intended to provide a single illustrative embodiment to aid in the description of the present valve.

In normal operation the spring 26 holds the valve 10 in a closed position, that is the sealing element 20 is held against the sealing surface 22 with sufficient force to substantially prevent fluid from communicating between the chamber interior 14 and the exterior 16. To open the valve 10, an actuator element 30 may be depressed at the distal end of the valve stem 18. Depressing the actuator 30 results in a force overcoming the spring 26 and removing the sealing element 20 from the vicinity of the sealing surface 22, resulting in an open channel for fluids to flow under the control of either an external source of pressurized fluid 42 or the pressure differential between the interior 14 and the exterior 16. The actuator shown is for illustrative purposes only, and the present description is not limited to simple mechanical methods of controllably displacing the sealing element. Electromechanical methods and magnetic methods of moving the sealing element may be mentioned as optional alternatives to that shown.

The valve 10 may be designed to fit into an aperture in the wall 12 from the inside 14 of the chamber. The aperture may be sealed by interior and exterior seals 32 and 34, positioned between the valve body 24, which may be too large to fit through the aperture in the wall 12, and a sealing attachment element 36, such as a nut that fits to a threaded surface of the valve stem 18. Optionally, the valve body 24 and valve stem 18 may be fabricated as a single piece, and the sealing of the tire valve in the aperture may be performed by what is known as a press fit, or in the case of an elastomer valve body and/or stem, the seal with the aperture may be formed by means of pushing a portion of the valve having a ridge slightly wider than the aperture through the aperture to a location of the valve that is at roughly the same diameter as the aperture.

With the described arrangement, inadvertent damage to the external portion of the valve stem 18 may not result in damage to the sealing surface 22, and thus the sealing element 20 continues to control the access to the interior of the chamber. This would for example, prevent a race car involved in a crash from suffering an additional problem of one of more tires blowing out, resulting in potential loss of control of the vehicle during the critical time period immediately following the crash. Thus such an arrangement would be an improvement over the valves currently used in the racing industry, and provide an improvement by reducing damage incurred after the initial contact.

In addition, it is possible to imagine collisions where the external pressure on the valve stem is sufficient to completely rip the entire valve body out of the wall 12, for example, rubber press fit tire valves may be pulled out of the steel or aluminum wheel wall of a normal automotive wheel, even though the rubber valves have a thick valve base that is located inside of the wheel In such an extreme case the above described valve, even though the sealing surface is protected inside the wheel, would still result in a sudden loss of tire pressure and the concomitant loss of vehicle control. For this situation a optional feature of the present valve disclosed herein provides that the valve stem 18, at a preselected location that is beyond that portion of the valve stem involved in attaching the valve 10 to the chamber wall 12, (i.e., the seals 34 and nut 36 in the figure) has an optional built in weak region 38 that breaks off at a pressure that is less than a pressure that is likely to remove the entire valve 10 from the aperture in the chamber wall 12. With such an arrangement, if a situation arises where the impact is so large as to damage even a sealing surface that is protected within the chamber wall 12, the strain on the sealing surface is maintained at a level below the damage threshold by the built in breakaway region 38. Preferably, the breakaway region 38 is located as close as possible to the surface of the chamber wall 12 as possible, without interfering with the valve 10 attachment to the chamber wall shown in this illustrative embodiment as elements 34 and 36, in order to improve the probability that an impact will not affect the near side (i.e., the side closest to the interior 14) of the breakaway region 38.

In another optional embodiment of the valve disclosed herein, there may be another spring 44 that contacts the top 40 of the sealing element 20 and may be attached at the breakaway region 38, for pressing the sealing element 20 away from the sealing surface 22 of the valve body 24. Preferably, the second spring 44 would have less force than the first spring 26 so that the valve would remain in a normally closed condition unless the actuator element 30 was depressed. Such an arrangement might be beneficial in the example of an over temperature situation. An increase in temperature naturally results in an increase in tire pressure. A known problem in the art is that airplane tires get very hot during the sudden impact of landing and braking procedures. As a result there are numerous instances of airplanes that land and have the tires blow out from a few seconds after contacting the runway, to as much as 10 minutes after landing. Such blowouts are an obvious problem if they occur during the slow down period immediately after landing since loss of control, which in large part depends upon the braking of the wheels by the pilot, may result in a major crash. It is also a problem if the blowout occurs during the slow speed entry into the gate area, since the sudden swerving of the aircraft into the terminal building may also be very damaging. For such a problem the spring 26 may be made of a heat sensitive material that losses, either permanently or temporarily, spring strength and thus allows the second spring 44 to open the valve, thus releasing the potentially damaging overpressure inside the aircraft tire, and avoiding the tire overpressure problem due to the over heating. The spring may be made of a material that melts at a specified temperature, and thus completely removes the spring force holding the sealing surface 22 to the sealing element 20, and resulting in the second spring 44 forcing the valve open against the pressure differential between the inside region 14 and the outside region 16. The tire will deflate in this example, but slowly since the air is escaping through the valve stem 18 at a controlled rate. Thus there may be no sudden loss in control over the aircraft by the pilot. Alternatively, the spring 26 may be made of a metal that temporarily losses spring strength as it heats up. As pressure is lost in the tire, the temperature within the tire naturally goes down, which would result in the spring 26 regaining the previous spring strength, and thus again closing the valve.

In this example the tire will only lose some of its pressure, as measured during the normal cold state, but no loss of aircraft control should result. It is also possible to imagine electronic devices that might control the location of the sealing element 20 in response to conditions such as temperature or pressure inside the tire, thus reducing the probability of sudden pressure loss due to tire rupture.

Figure 2:
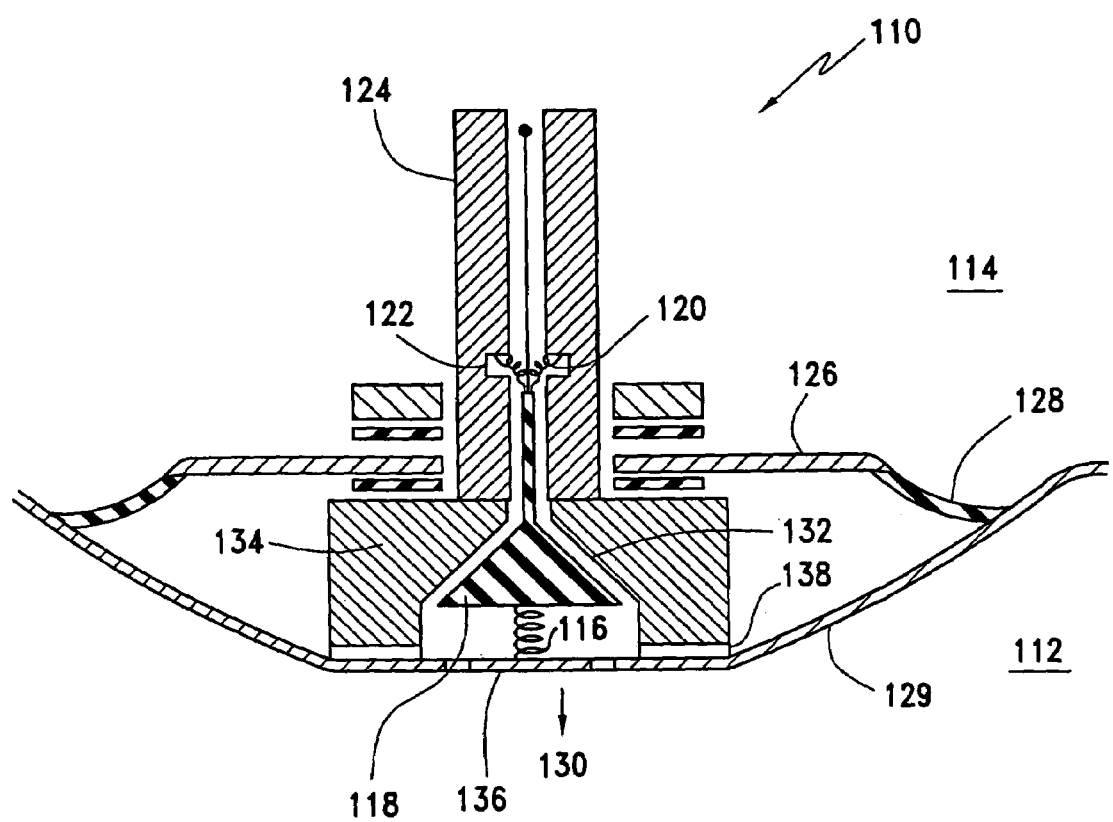
FIG. 2 is a cross section view of an over pressure embodiment safety response of the claimed valve.

Referring now to FIG. 2, another embodiment of the valve 110 is shown that reacts to a pressure differential between the interior region 112 and the exterior region 114 by reducing the pressure of the spring 116 on the sealing element 118, thus resulting in the second spring 120 opening the valve to partially equalize the internal and external pressures. In this embodiment, a mechanical method of reacting to an internal overpressure is described. There are numerous additional methods that may be used such as the use of an electronic, magnetic or electromechanical devices, which may be remotely monitored and/or controlled. The secondary springs 120 are shown in this embodiment as being anchored in the breakaway portion 122 of the valve stem 124, but the valve disclosed herein is not limited to having a secondary spring in this location, which is chosen for simplicity of the drawing. The pressure chamber wall 126 has flexible diaphragms 128 that are attached to the main spring 116 flexible attachment plate (reference numbers 129 and 136 combined), which may be perforated to permit fluid communication within that portion of the chamber area. As the diaphragms 128 move toward the exterior 114 under the increased pressure of the interior 112, the portion of attachment plate 129 that is beyond the fulcrum 138 of the valve body 134 will flex downward in the direction 130, thus reducing the spring pressure of the spring 116 on the sealing element 118 towards the sealing surface 132. When the pressure differential reaches a specified level, set by the flexibility of the diaphragms 128, the spring strength of spring 116 and the spring strength of springs 120, the sealing element 118 will separate from the sealing surface 132, and the valve will be in an open condition. This figure shows an illustrative embodiment of a mechanical over pressure safety valve that will return to the normal closed state when the over pressure situation ends. Thus a situation such as the aircraft tire over temperature and pressure condition during landing and high speed taxiing mentioned previously, may be reduced or eliminated without sudden and complete loss of tire pressure, and without permanent damage to the tire, as may occur when running a tire in the flat condition.

An alternative mechanical embodiment with fewer moving parts may be imagined in which the valve stem 124 is attached to the wall 126 of the chamber as previously discussed, but not attached to the valve body 134 which contains the sealing surface 132, which is now movable. In this embodiment the secondary springs 120 firmly attach the sealing element 118 to the valve stem 124 and provide part of the biasing of the sealing element 118 with respect to the movable sealing surface 132. Spring 116 is attached to optionally non-movable attachment plate 136, which maybe firmly connected to the chamber wall 126 in a direction out of the plane of the figure. The element 129 is not attached to the attachment plate 136 in this embodiment, but is securely attached to the valve body 134, for example at point 138. The element 129 does not need to be flexible, and moves the valve body 134 up and down with respect to the valve stem 124 in concert with the movement of the diaphragms 128. Thus, as the pressure inside the chamber at 112 increases, the diaphragms 128 move upwards toward the region 114, the valve body attachment element 129 moves upward, and the valve body 134 moves upward, and consequently the valve sealing surface 132 moves away from the valve sealing element 118, which is attached to the valve stem 124 by elements 120. Thus the only moving part in this embodiment of a mechanical over pressure relief valve is the combination of the valve body 134, the attachment element 129 and the diaphragms 128.

Figure 3:
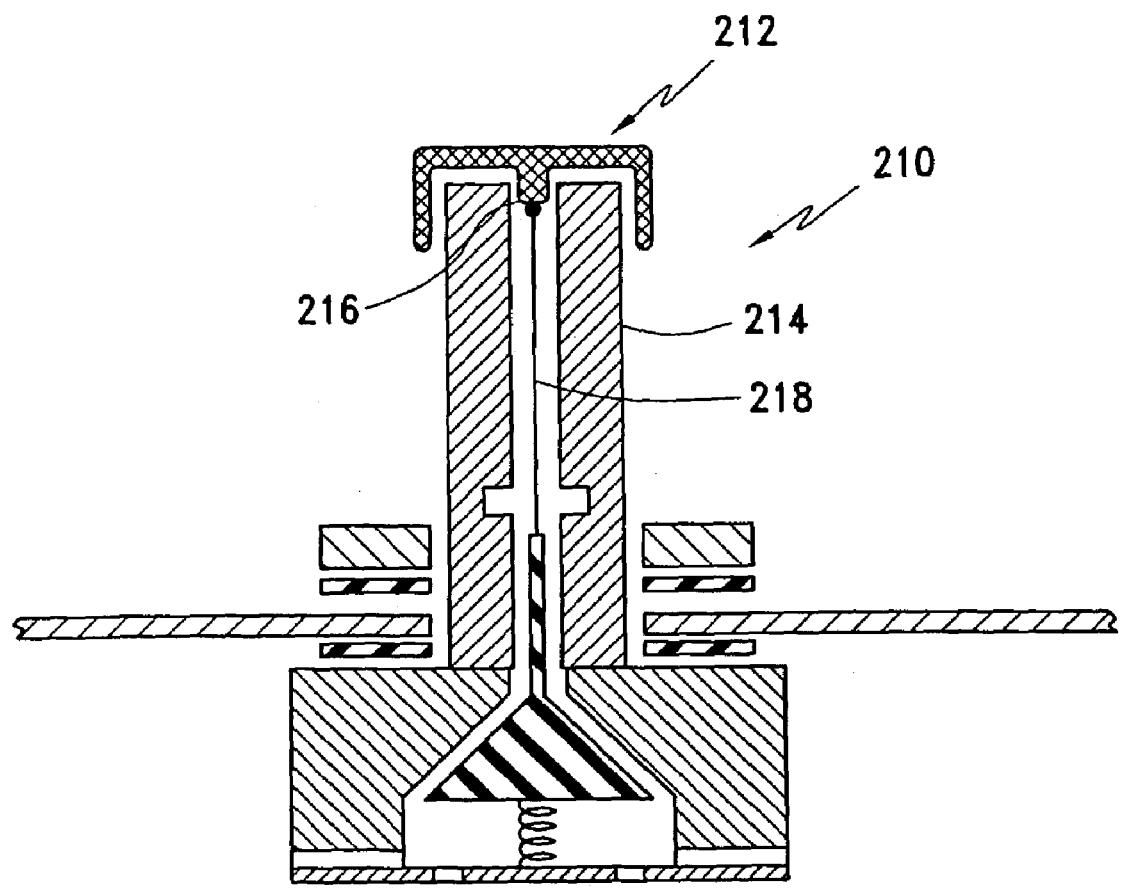
FIG. 3 is a cross section view of a normally open embodiment of the claimed valve.

Referring now to FIG. 3, a normally open valve 210 is shown, which is structurally similar to the normally closed valves of the previous figures, but with a cap 212 that is attached to the valve stem 214, for example by a threaded structure on the valve stem 214. The cap 212 has an element 216 that depressed the valve actuator 218 when screwed on to a sufficient level, or attached at an appropriate location by some other means. The valve actuator depressing element 216 may also easily be seen to possibly be built into the valve stem 214, for example as a projection from the inner surface of the valve stem rather than projecting from the cap 212 as shown. The present invention is not limited to the presence of a valve cap in the normally open case illustrated in this figure, and the member 216 may be easily seen to be located in various positions depending upon the design requirements of the specific situation. For example, the normally open valve may be used in a storage tank situation where the outflow of gas in either a normal or emergency situation is not permitted to vent to the atmosphere, and would then pass through the valve tube 214 to a pipe or overflow containment vessel. In either case, this arrangement results in a normally open valve that may be used as a safety valve or a pressure relief valve. The cap 212 may not completely cover or seal the open end of the valve stem (as in for example the previously mentioned overflow tank case), and may be perforated to allow controlled amounts of fluid to pass. Similarly to the previously disclosed illustrative embodiments, the cap 212 and/or the element 216 may be made of a temperature, chemical or pressure sensitive material so that the normally open valve shown may become a normally closed valve when the element 216 ceases to press the valve actuator 218 to the open position. The element 216 may clearly further be an externally operated and/or monitored electronic, magnetic or electromechanical element to provide a controllable open and close switching action.

Figure 4:
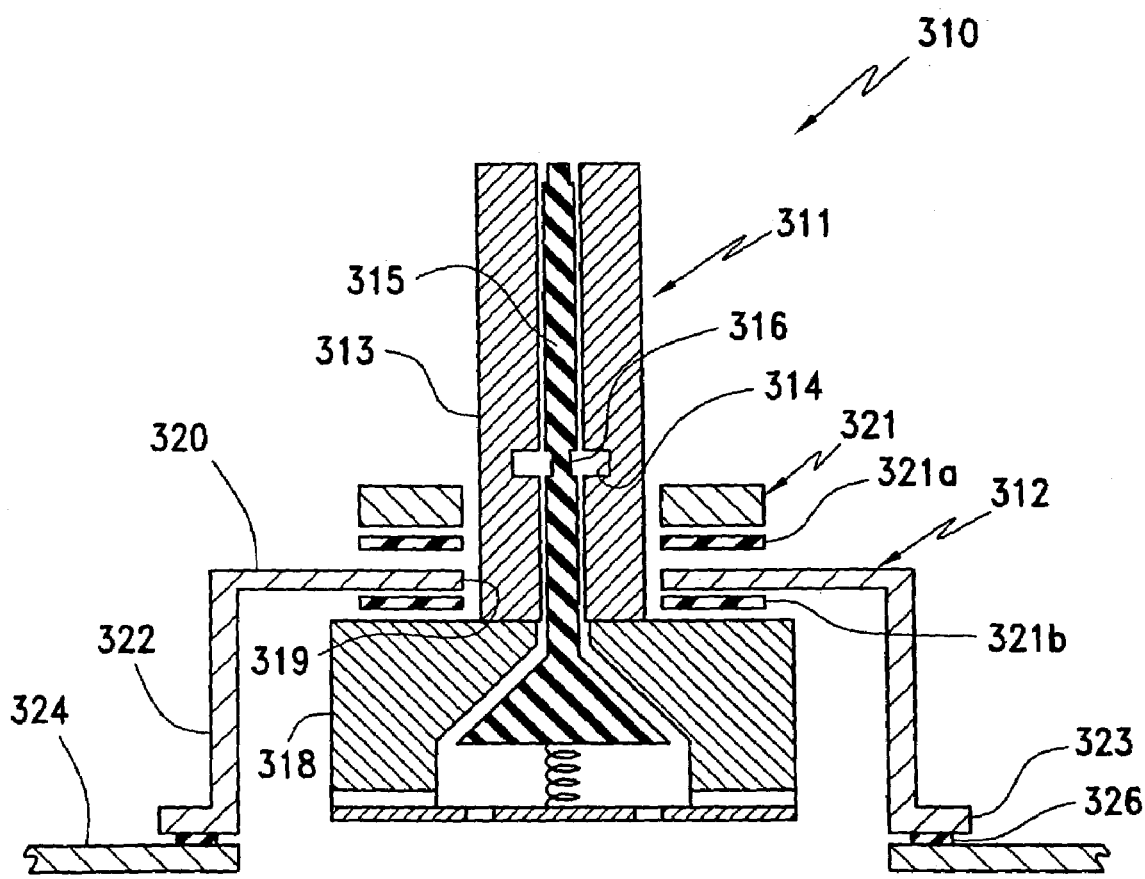
FIG. 4 is a cross-sectional view of a valve assembly having a housing which is in turn mounted around an opening in the wall of a chamber.

FIG. 4 illustrates a valve assembly 310 that includes the previously described valve 311 of the first embodiment in combination with a housing 312. The valve 311 includes a hollow valve stem 313 with a weakened, breakaway portion 314 as shown. A valve actuator 315 is concentrically disposed within the hollow, tubular valve stem 313 and likewise includes a breakaway portion 316, which, in the preferred embodiment, is slightly below or proximate to the breakaway portion 314 of the stem 313. The valve stem 313 is connected to valve body 318 as indicated. In the preferred embodiment, the valve stem 313 may be integrally formed with the valve body 318, or it may exist as a separate part sealingly connectable to the valve body 318 via screw threads or the like. The valve stem 313 extends through a circular opening 319 in the upper portion or wall 320 of the housing 312. A sealing nut 321 in combination with upper and lower gaskets 321a, 321b provides a fluid seal between the upper portion 320 of the housing 312, and the valve stem 313 and body 318. Preferably, the breakaway portions 314, 316 of the stem 313 and actuator 315 are proximate to the upper surface of the gaskets 321 so that, in the event of an accident condition, the stem 313 and the actuator 315 will sheer off adjacent to the upper surface of the gaskets 321a, 321b. The lower portion 322 of the housing 312 is sealingly mounted onto a wall 324 of the chamber 325. This may be effected by way of a weld bead 326 as illustrated, or via screw threads, chemical bonding or the like. In this embodiment 310, the depth of the housing 312 is larger than the depth of the valve body 318 such that no portion of the valve 311 extends into the chamber 325.

Figure 5:
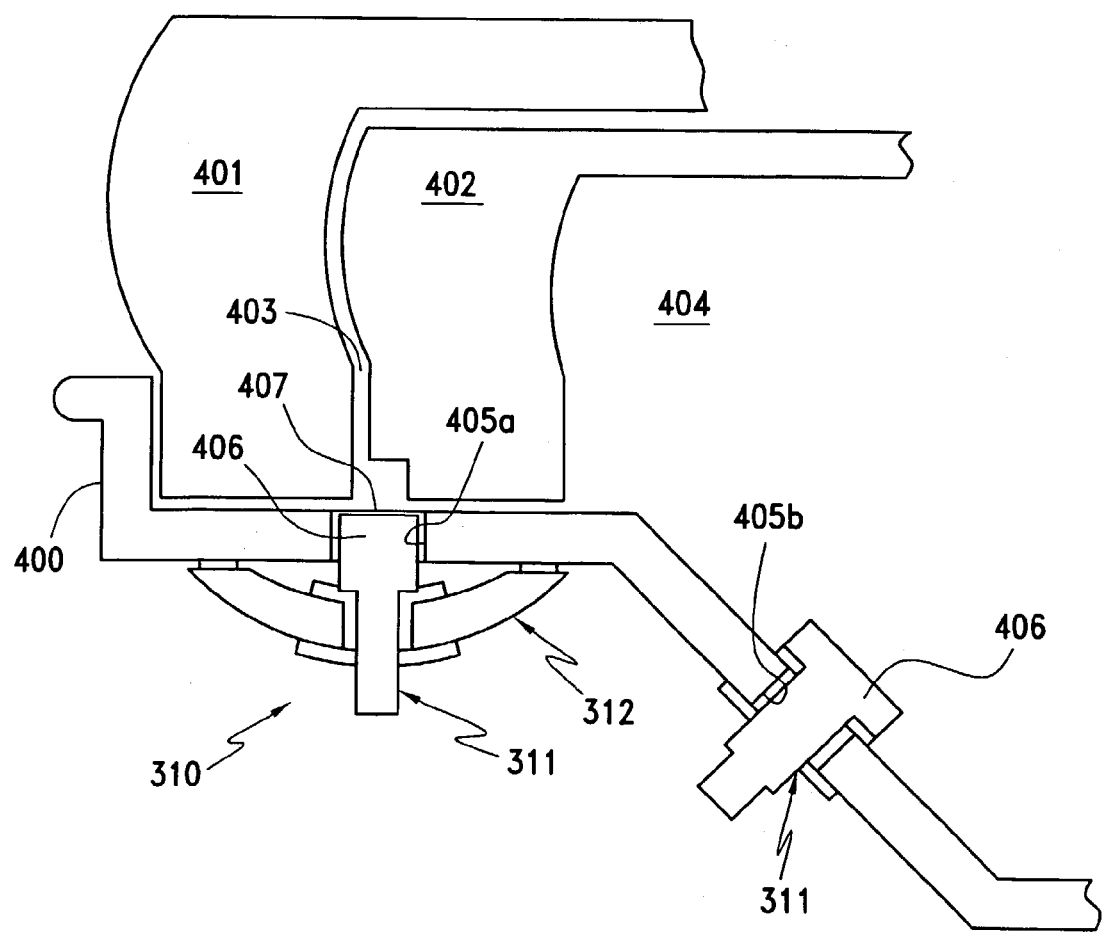
FIG. 5 is a cross-sectional view of an auto racing rim with outer and inner tires with the FIG. 4 valve assembly mounted on the rim such that no portion of the valve body extends beyond the bend area of the rim.

FIG. 5 illustrates a practical application of the valve assembly 310 illustrated in FIG. 4. Here, the combination valve 311 and housing 312 have been applied to a racing tire rim 400 of the type which accommodate an outer tire 401, and an inner tire 402. The chamber 403 for the outer tire and the chamber 404 for the inner tire communicate with circular openings 405a and 405b, respectively. The opening 405b to the inner tire chamber 404 is not positioned over a bead surface of the tire 402. Hence, it is possible to simply use the valve 311 of the invention without the housing 312, as the extension of the valve body 406 into the chamber 404 is of no consequence. By contrast, the opening 405a to the outer tire chamber 403 traverses a bead surface 407 of the inner tire 402. Hence it is important that the valve body 406 not extend beyond the bead surface 407. Consequently, the housing 312 is used in combination with the valve 311 in the manner previously discussed. Note how the depth of the housing 312 is greater than the axial length of the valve body 406. In FIG. 5, the housing 312 is advantageously bubble-shaped instead of cylindrical in order to better withstand the type of mechanical shock that might be applied to the hollow stem of the valve 311 in the event of an accident condition.

Figure 6:
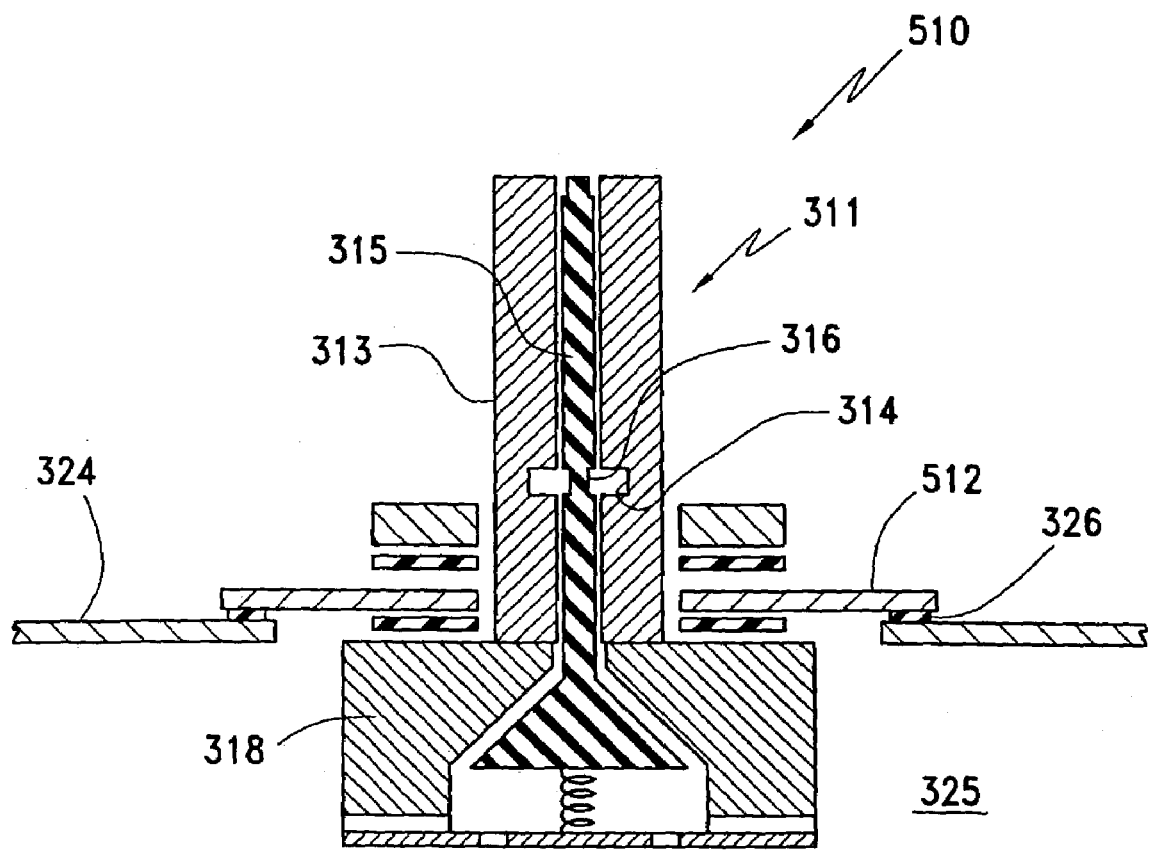
FIG. 6 is a further embodiment of the valve assembly having a flat housing which allows the valve to be mounted on the outside of the chamber such that the valve body partially extends into the chamber.

FIG. 6 illustrates still another embodiment 510 of the valve assembly comprising the combination of a valve 311, and a housing 312 wherein the housing is a substantially flat plate. In such an embodiment, the relatively shallow offset provided by the combination of the housing 312 and the weld bead 326 surrounds only a very small portion of the top of the valve body such that most of the valve body 318 extends into the chamber 325. Such a shallow chamber 312 may be used in instances where only a small amount of offset is needed between the valve body 318 and the chamber wall 324. It is also useful in instances where it is difficult, if not impossible to mount the valve 311 from the inside of the chamber. Under such circumstances, an exterior mounting such as that provided by a shallower flat housing 312 may be preferred.

Figure 7:
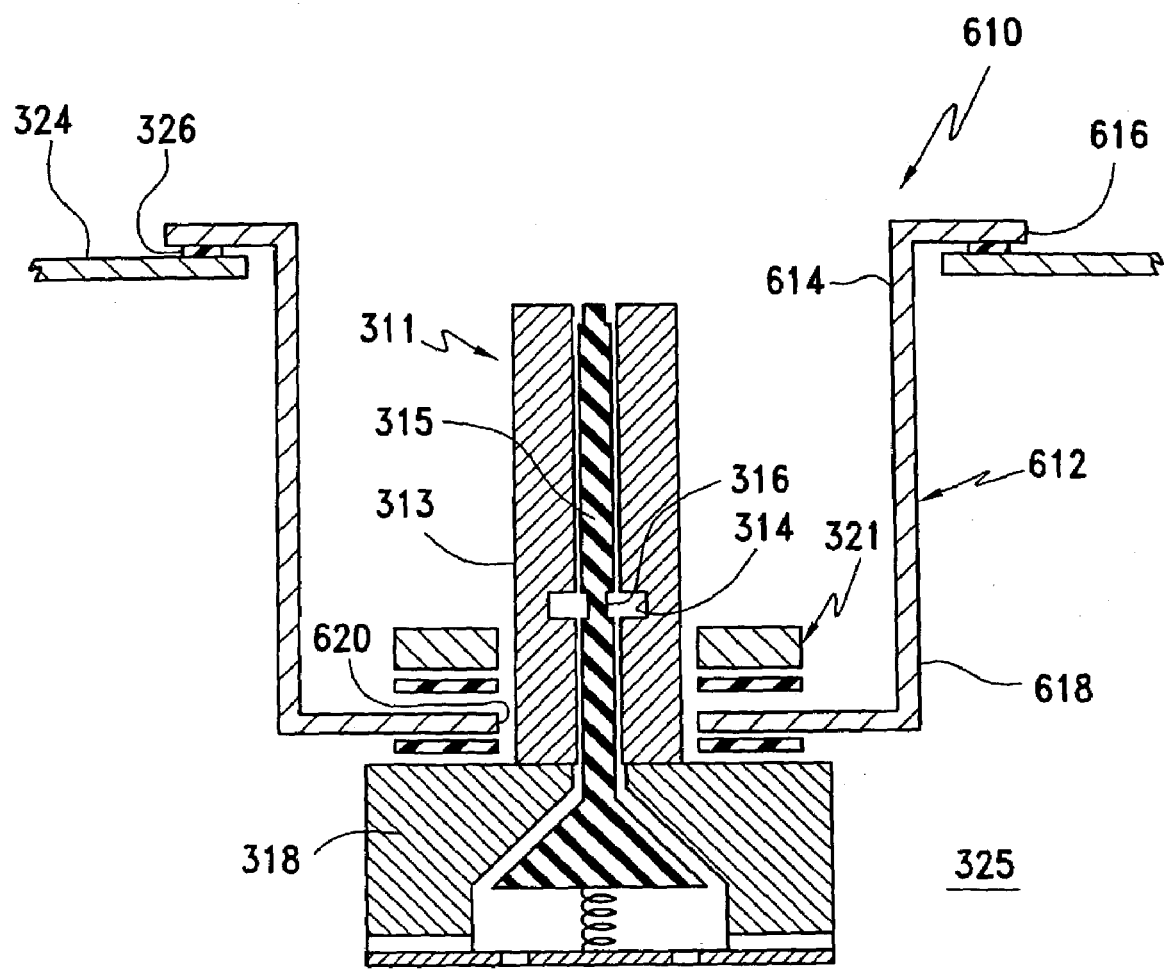
FIG. 7 is another embodiment of the valve assembly wherein the housing is recessed within the chamber to protect the stem of the valve from impact or mechanical shock associated with an accident condition.

FIG. 7 illustrates another embodiment 610 of the valve assembly comprising the combination of the inventive valve 311 and a recessed housing 612. The recessed housing 612 includes an end portion 614 having a flange 616 which may be sealingly mounted around an opening in a chamber wall 324 by way of a weld bead 326 or any of the other aforementioned known means. The housing 612 further includes an opposite end wall 618 having an opening 620 through which the hollow valve stem 313 extends. By contrast, the body of the valve 318 protrudes into the interior of the chamber 325, as does the housing 612. Sealing nut 321 provides a pressure seal between the valve 311 and the wall 618. In this particular embodiment, the depth of the housing 612 is higher than the depth of the hollow valve stem 313 so as to protect the entire valve 311 from the shock or mechanical impact associated with an accident condition. This embodiment may find particular utility for storage containers of flammable or hazardous materials when such storage containers are transportable via a truck or rail car. In the event of an accident, the recess provided by the recessed housing 612 protects all portions of the valve 311 and valve stem 313 three hundred sixty degrees, greatly lowering the probability that the valve 311 will be exposed to any mechanical damage or that the hollow valve stem 313 will be broken off.

Figure 8:
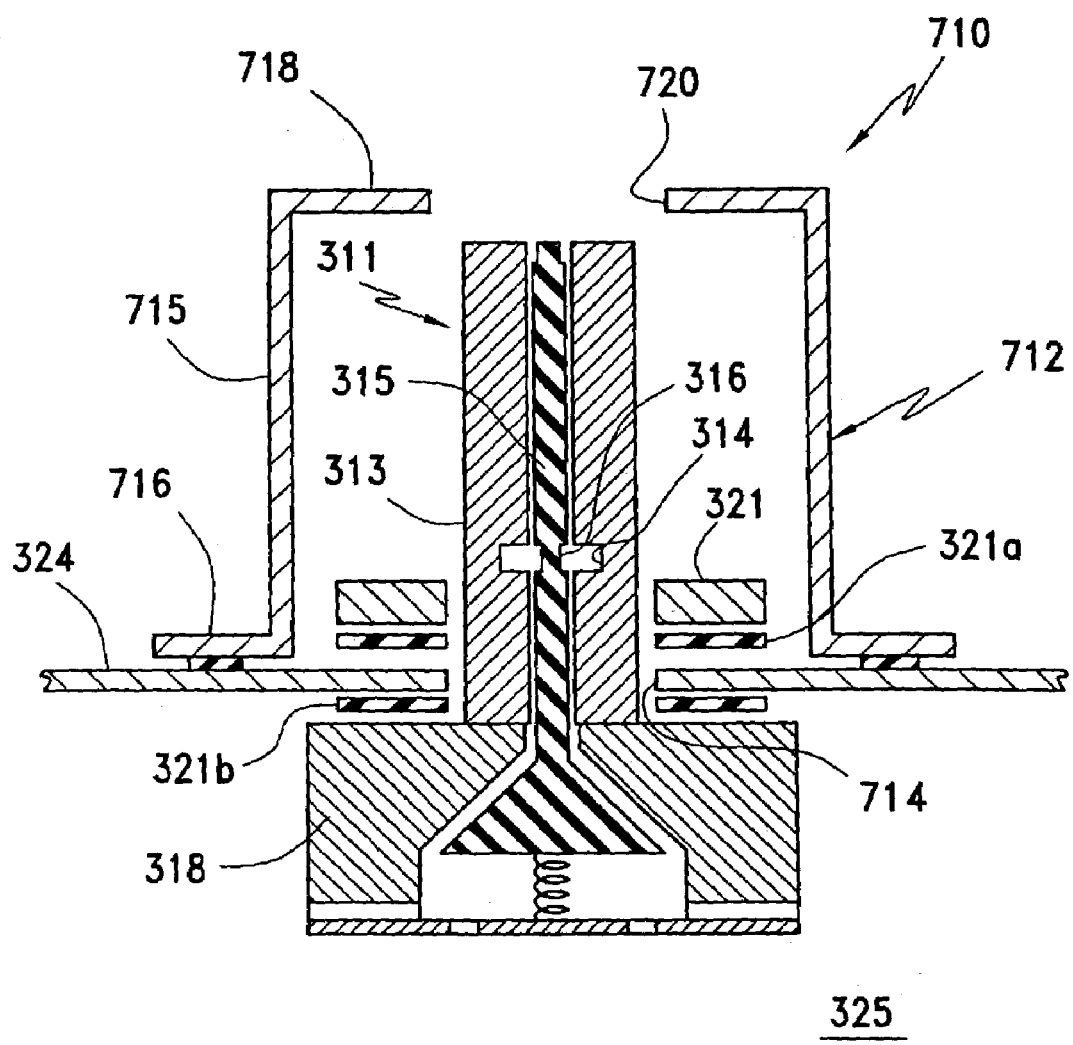
FIG. 8 is a final embodiment wherein the valve is mounted to the chamber wall as shown in FIG. 1 and the housing is likewise mounted on the chamber wall and circumscribes the valve stem in order to protect it.

FIG. 8 illustrates still another embodiment 710 of the valve assembly comprising the combination of the inventive valve 311 in combination with a protruding housing 712 designed to protect the stem 313 of the valve 311. In this embodiment, the valve 311 is mounted in an opening 714 in the chamber wall 324 as shown, with the valve body 318 extending into the chamber 325, and the valve stem 313 extending away from the chamber 325. The valve 311 is mounted in the opening 714 via sealing nut 321 in combination with the aforementioned gaskets 321a, 321b. The housing 712 completely surrounds all portions of the valve stem 313, and includes a flange 716 for mounting the housing against the outer surface of the chamber wall 324. In this preferred embodiment, the walls 715 of the housing 712 are cylindrical; however, they may be any desired shape. The housing 712 further includes a top wall 718 having an opening 720 that allows access to the valve stem 313. The flange 716 may be mounted onto the chamber wall 324 by a weld (as shown), or by a chemical adhesive or the combination of a gasket and nuts and bolts (not shown). This particular embodiment of the invention affords a high degree of protection to the valve 311, since the valve body 318 is disposed at a protected position within the chamber 325, and the valve stem 313 is completely surrounded by the housing 715. It finds particular application in, for example, race car tires where the valve 311 is likely to be exposed to high degrees of mechanical impact as a result of accident conditions.

Figure 9:
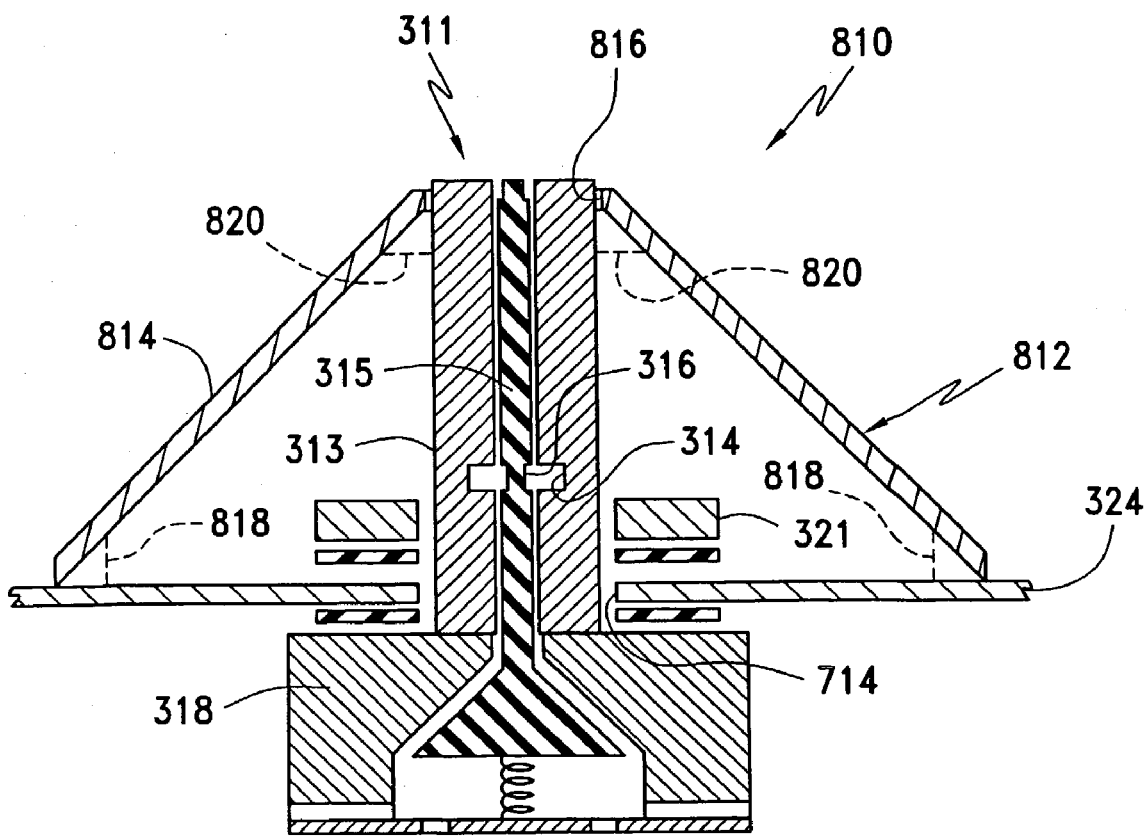
FIG. 9 is a variation of the FIG. 8 embodiment where the housing is conically shaped, and connected to either or both of the chamber wall and valve stem.

FIG. 9 illustrates a final embodiment 810 of the invention. This embodiment comprises the inventive valve 311 in combination with a conical housing 812. The valve 311 is mounted in the same manner as described with respect to the FIG. 8 embodiment; i.e., the valve body 318 is disposed within the chamber 325, while the valve stem 313 extends through an opening 714 in the chamber wall 324. The top portion of the conically shaped housing 812 includes a circular opening 816 that provides access to the top portion of the valve stem 313. The circular opening 816 is closely dimensioned to the outer diameter of the stem 313 to afford a high degree of protection to the stem. The conical housing 812 is mounted in place by either or both of a lower mounting 818 or an upper mounting 820 (both of which are shown in phantom). These mounts 818, 820 may be a weld, a screw joint, or a chemical bond such as glue. This particular embodiment 810 is likewise particularly adapted for use in environments where the valve 311 is likely to be subjected to a high degree of mechanical shock, such as a race car tire. The conical shape of the housing 812, in combination with both upper and lower mounts 818, 820 affords a somewhat more robust design as the housing 812 is reinforced by both an upper and a lower mount, and as its conical shape is better designed to deflect any mechanical impact it might experience as a result of an accident. In all of these embodiments, the stem 313 and body 318 of the valve 311 may be integrally formed instead of formed as two discreet pieces, in order to simplify construction and reduce manufacturing costs. Also, the valve 311 and any of the disclosed housings may be formed as one piece.

In summary, the features of the valve and valve assembly disclosed herein, as shown in the attached figures, include that the location of the air valve sealing surfaces may be at or around the bottom of the valve stem and predominantly inside of the chamber wall (typically metal or other solid material) The valve stem may have a built in "break away" region that leaves the valve sealing surfaces intact after collision damage to the valve stem. The break away region cut location may be located at approximately the level of the exposed surface of the chamber or wheel wall. There may be multiple break away regions built into the valve. The valve stem and other valve parts may be variously fabricated of plastic, rubber, elastomers or metals such as brass, bronze, beryllium bronze, steel, stainless steel or titanium. The sealing elements may be biased away from, or against the sealing surface without the use of springs or elastomers, by means of the pressure differential, magnetic force or electrostatic forces.

While the valve and valve assembly has been disclosed in connection with the preferred embodiments shown and described in detail, various modifications and improvements thereon will become readily apparent to those skilled in the art. Accordingly, the spirit and scope of the present disclosure is to be limited only by the following claims.

What is claimed is:

1. A valve assembly for sealing a chamber having a wall, comprising:
   a valve including a valve stem, a valve body in communication with said chamber and having an end coupled to the valve stem and another end having a valve sealing surface, a valve sealing element disposed proximate to the sealing surface, and a resilient element that biases the sealing element with respect to the valve sealing surface, and
   a housing enclosing a portion of said valve,
   wherein said valve stem has a weakened portion that breaks upon the application of a predetermined force.

2. The valve assembly according to claim 1, wherein said housing communicates with said chamber and is mounted on said chamber wall.

3. The valve assembly according to claim 2, wherein said housing encloses at least a portion of said valve body and has an upper portion through which said valve stem extends.

4. The valve assembly according to claim 2, wherein no portion of said valve extends into said chamber.

5. The valve assembly according to claim 4, wherein said weakened portion is located proximate to the upper portion of the housing.

6. The valve assembly according to claim 1, wherein said valve stem contains an actuator element for displacing the valve sealing element away from the valve sealing surface, and said actuator element includes a weakened portion.

7. The valve assembly according to claim 6, wherein said weakened portion of said actuator element is proximate to said weakened portion of said valve stem.

8. The valve assembly according to claim 2, wherein said housing includes a lower portion sealingly mounted around an opening in the wall of said chamber.

9. The valve assembly according to claim 8, wherein said housing and said chamber wall are formed from metal, and a lower edge of said housing is welded to said chamber wall around said opening.

10. The valve assembly according to claim 8, wherein said lower portion of said housing is chemically bonded in sealing engagement to said chamber wall.

11. The valve assembly according to claim 8, wherein said lower portion of said housing is mechanically connected in sealing engagement to said chamber wall.

12. The valve assembly according to claim 11, wherein a gasket is disposed between said lower portion of said housing and said chamber wall, and said lower portion of said housing includes a flange secured to said chamber wall by a threaded fastener.

13. The valve assembly according to claim 1, wherein said housing protrudes away from said chamber wall.

14. The valve assembly according to claim 1, wherein said housing extends into said chamber.

15. The valve assembly according to claim 13, wherein said housing surrounds a portion of said valve body and a portion of said valve body extends into the chamber.

16. The valve assembly according to claim 13, wherein said valve is mounted on said chamber wall, said valve body extends into said chamber, and said housing surrounds at least a portion of said valve stem.

17. The valve assembly according to claim 16, wherein said housing surrounds all of said valve stem.

18. The valve assembly according to claim 17, wherein said housing is connected to one or the other of said chamber wall and a distal end of said valve stem.

19. The valve assembly according to claim 14, wherein the valve is mounted on a wall of said housing, and said housing surrounds at least a portion of said valve stem.

20. The valve assembly according to claim 13, wherein said housing is cylindrical.

21. The valve assembly according to claim 13, wherein said housing is dome-shaped.

22. The valve assembly according to claim 13, wherein said housing is conically shaped.

23. The valve assembly according to claim 13, wherein said housing has a lower portion sealingly mounted to an outside surface of said chamber wall around an opening therein.

24. The valve assembly according to claim 13, wherein said housing has a lower portion sealingly mounted to an inside surface of said chamber wall around an opening therein.

25. The valve assembly of claim 1, wherein the valve and the housing are formed as one piece.

26. A valve assembly for sealing a chamber having a wall, comprising:
a valve including a valve stem, a valve body coupled to the valve stem at one end and having a valve sealing surface at another end, a valve sealing element disposed proximate to the valve sealing surface, and a resilient element that biases the sealing element with respect to the valve sealing surface, and
a housing enclosing said valve body, valve sealing surface and sealing element, said housing having an upper portion through which said valve stem extends and a lower portion sealingly mounted around an opening in said chamber wall such that no portion of said valve extends into said chamber,
wherein said valve stem has a weakened portion disposed at a portion of the valve stem outside of the housing that breaks upon the application of a predetermined force.

27. The valve assembly according to claim 26, wherein said wall of said chamber is a rim for a pneumatic tire.

28. The valve assembly according to claim 26, wherein said weakened portion is located proximate to the upper wall of the housing.

29. The valve assembly according to claim 26, wherein said valve stem contains an actuator element for displacing the valve sealing element away from the valve sealing surface, and sad actuator element includes a weakened portion.

30. The valve assembly according to claim 29, wherein said weakened portion of said actuator element is slightly below or proximate to said weakened portion of said valve stem.

31. The valve assembly according to claim 26, wherein said resilient element is a spring that biases said valve sealing element toward said valve sealing surface.

32. The valve assembly according to claim 26, further comprising a gasket for providing a seal between said valve body and an opening in said upper wall of said housing through which said valve stem extends.

33. A valve assembly for sealing a chamber having a wall, comprising:
a valve means including a valve body having a valve sealing surface at one end and a valve stem extending from an opposite end, and
a housing in communication with said chamber, and enclosing at least a portion of said valve, said housing having an end portion mounted onto said chamber wall,
wherein said valve stem includes breakaway means disposed outside an upper portion of said housing.

34. The valve assembly according to claim 33, wherein no portion of said valve means extends into said chamber.

35. The valve assembly according to claim 33, wherein a portion of said valve means extends into said chamber.

36. The valve assembly according to claim 33, wherein said breakaway means is located proximate to said upper portion of said housing.

37. The valve assembly according to claim 33 wherein said housing protrudes away from said chamber.

38. The valve assembly according to claim 33, wherein said housing extends into said chamber.

39. A valve assembly for sealing a chamber having a wall, comprising:
a valve including a valve body having a valve sealing surface at one end and a valve stem extending from an opposite end, and
a housing mounted on an outside surface of said chamber and over an opening in said wall,
wherein said housing circumscribes a lower portion of said valve stem and said opening surrounds the end of the valve body having a valve sealing surface, and
wherein said valve stem has a weakened portion located above said housing that breaks upon the application of a predetermined force.

40. The valve assembly of claim 39, wherein the end of the valve body having a valve sealing surface further includes a valve element, and a biasing means for sealingly engaging said valve element against said valve seat.

41. The valve assembly of claim 39, wherein the end of the valve body having a valve sealing surface does not extend through said opening beyond an inner surface of said wall of said chamber.

42. The valve assembly of claim 39, wherein said chamber wall is a tire rim.

43. The valve assembly of claim 39, wherein the end of the valve body having a valve sealing surface is not attached to surfaces defining the opening in the chamber wall.

44. The valve assembly of claim 39, wherein the valve and the housing are formed as one piece.

45. The valve assembly of claim 39, wherein said weakened portion of said valve stem is located proximate to an upper portion of said housing.

* * * * *